Sept. 12, 1933. W. A. HUTTON 1,926,695
RAILWAY TRACK AND PLATFORM STRUCTURE
Filed June 9, 1932
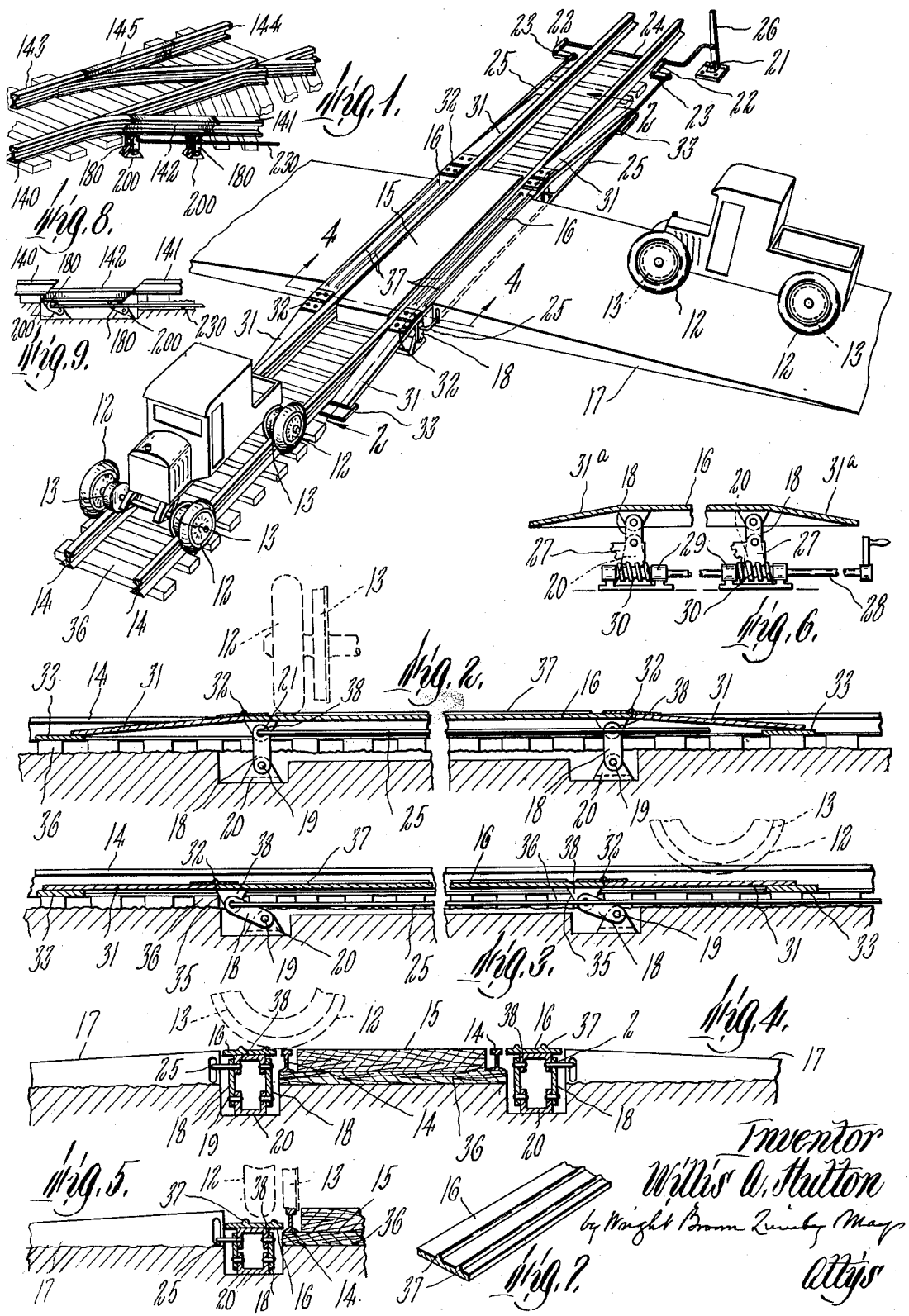
Inventor
Willis A. Hutton
by Wright Brown Quinby Mays
Attys Patented Sept. 12, 1933

1,926,695

UNITED STATES PATENT OFFICE 1,926,695

RAILWAY TRACK AND PLATFORM STRUCTURE

Willis A. Hutton, Melrose, Mass.

Application June 9, 1932. Serial No. 616,192

7 Claims. (Cl. 105—215)

The object of this invention is to provide a railway track and platform structure adapted for use with a motor truck having the usual road wheels and flanged wheels adapted to run like railway car wheels on the usual rails of a railway track, the road wheels being concentric with the flanged wheels, and of somewhat larger diameter, said structure being adapted to be quickly and easily conditioned so that first the road wheels may run from a highway onto the structure, the flanged wheels being inoperative, and the truck may be lowered to engage the flanged wheels with the track rails, and render the road wheels inoperative, and secondly, the truck may be raised to remove the flanged wheels from the rails and render the road wheels operative so that the truck may run from the structure to a highway, all without jolting and jarring the wheels and the truck as a whole.

Of the accompanying drawing forming a part of this specification,—

Figure 1 is a perspective view showing my improved structure associated with two highway portions, and a truck approaching the structure on its road wheels, and leaving the structure on its flanged wheels.

Figure 2 is a longitudinal section on the plane indicated by line 2—2 of Figure 1.

Figure 3 is a view similar to Figure 2 showing the structure conditioned to permit the flanged wheels to run on the track rails, the road wheels being inoperative.

Figure 4 is a transverse section on the plane indicated by line 4—4 of Figure 1.

Figure 5 is a view similar to a portion of Figure 4, showing the structure conditioned to render the flanged wheels operative, and the road wheels inoperative.

Figure 6 is a fragmental sectional view showing an alternative construction of the movable supports hereinafter described, and the adjusting mechanism associated therewith.

Figure 7 is a perspective view showing a portion of one of the side platforms.

Figure 8 shows in perspective elements of a track which includes a main line and a siding.

Figure 9 is a side view of a portion of the track shown by Figure 9.

The same reference characters indicate the same parts in all of the figures.

The truck shown in two positions by Figure 1 is provided with the usual road wheels 12, and, as has often been proposed heretofore, with flanged wheels 13 located beside the road wheels and of smaller diameter than the latter, the peripheries of the wheels being concentric with each other, and the flanged wheels located at the inner sides of the road wheels.

My improved track and platform structure comprises the usual parallel rails 14 of a railway track section, a fixed central platform 15 between the rails, the top surface of said platform being flush with the rail treads, and its longitudinal edges spaced therefrom to receive the flanges of the wheels 13, as shown by Figure 5, and two movable side platforms 16 located at the outer sides of the rails 14, and extending parallel therewith.

The structure comprises also adjustable supporting means engaged with the side platforms 16 and movable to support the platforms in a raised position flush with the rail treads and with the central platform 15, so that the three platforms and the rail treads collectively constitute a horizontal area on which the truck may be maneuvered under its own power from a highway portion 17, to park it with its road wheels on the side platforms and its flanged wheels located in position to be lowered onto the rail treads.

Said adjustable supporting means may be of any suitable construction. I prefer to embody said means in swinging struts 18 pivoted at 19 to fixed supports 20 and at 21 to the side platforms 16.

The struts are adapted to swing in vertical planes and thereby impart vertical and horizontal endwise movements to the side platforms.

I provide adjusting mechanism hereinafter described for adjusting the supports to lower the side platforms and a truck parked thereon, and means for limiting the downward movement of the supports and platforms, the arrangement being such that when the side platforms are fully lowered the flanged wheels 13 bear on the rail treads, and the road wheels 12 are separated from the side platforms as indicated by Figure 5, so that the truck is adapted to run on the track rails, the road wheels being inoperative.

The adjusting mechanism is operable to cause the supporting means to raise the lowered side platforms to a position flush with the central platform and the rail treads, and thereby raise the flanged wheels from the rails and complete the area above described, so that the truck may be maneuvered by its road wheels onto the highway portion 17, or onto either of two highway portions at opposite sides of the structure, said highway portions having ends adjacent the side platforms and flush therewith when the platforms are raised.

The adjusting means may include a manually operable member such as a lever 26 fulcrumed at 21 to a fixed support, and connections between said lever and the adjustable supports whereby they may be simultaneously adjusted to lower and raise the side platforms. In this instance, the supports being swinging struts, the connections between the member 26 and the struts may include bell crank levers 22 fulcrumed at 23 on fixed supports, connections 24 between the member 26 and the bell crank levers, and connections 25 between the bell crank lever and the struts.

An alternative form of adjusting means is shown by Figure 6, said means including worm gear segments 27 on the struts, a crank shaft 28 journalled in fixed bearings 29 and worms 30 fixed to the crank shaft and meshing with the segments 27.

The side platforms 16 are provided with ramps 31 on which the road wheels 12 may run smoothly downward from the platform to positions beside the rails, and upward from said positions to the platforms, when the latter are raised. The ramps are preferably of considerable length to provide easy inclines and are connected by hinges 32 with the side platforms, their outer ends being slidable on horizontal wear plates 33 fixed below the rail treads. If desired, however, the ramps may be extensions 31a fixed to the side platforms and more abruptly inclined than are the ramps 31, as indicated by Figure 6. The ramps are arranged to guide a truck upward from the rails to the side platforms when the latter are raised, so that the supports and adjusting mechanism are relieved of the duty of raising the truck with the side platforms.

The downward movement of the supports 18 and platforms 16 may be limited by fixed stops 35, provided, for example, by portions of ties 36 supporting the track rails. In this instance ears 38 fixed to the side platforms 16 and pivoted to the struts 18, abut said stops as shown by Fig. 3, when the platforms are fully lowered.

To assist the truck driver in properly locating the road wheels 12 on the side platforms 16, said platforms may be provided with guiding means which may be embodied in small ribs 37 projecting upwardly from and extending lengthwise of upper surfaces of said platforms as shown by Figures 1, 2, 3 and 7.

It will be seen that the described structure permits a truck equipped with two sets of wheels to be transferred from a highway to track rails, and from the track rails to the highway, without jolts and jars.

Figures 8 and 9 show a railway track which includes fixed rail portions 140 and 141, and an intermediate rail portion 142 which is movable so that it may be located in position to connect the treads of the portions 140 and 141, as shown by Figure 8, and displaced to leave a gap therebetween as shown by Figure 9. The track includes also fixed rail portions 143 and 144 and an intermediate rail portion 145, which is movable so that it may be located in position to connect the treads of the portions 143 and 144, and displaced to leave a gap therebetween similar to that shown by Figure 9. The several rail portions are elements of a track which includes a main line and a branch, or siding.

The movable rail portions 142 and 145 are mounted on movable supports which, in this instance, are swinging struts 180 pivoted to said movable portions and to fixed supports 200, the struts being movable by mechanism similar to that employed to move the struts 18. Said mechanism may include connecting rods 230 similar to the rods 23.

I claim:

1. A track and platform structure for use with motor trucks having road wheels and rail wheels adapted to be used alternately, said structure comprising the usual rails of a railway track section, a fixed central platform between the track rails and flush with the treads thereof, movable side platforms located at the outer sides of the rails, and extending parallel therewith, adjustable supports engaged with the side platforms and movable to support the same in a raised position flush with the rail treads and central platform, so that said platforms and rail treads collectively constitute an area on which a truck may be maneuvered from a highway to park it with its road wheels on the side platforms, and its flanged wheels located in position to be lowered onto the rail treads, and adjusting mechanism for adjusting said supports to lower the side platforms and a truck parked thereon, means being provided for limiting the downward movement of the supports and side platforms, the arrangement being such that when the side platforms are fully lowered the flanged wheels bear on the rail treads, and the road wheels are separated from the side platforms, so that the truck is adapted to run on the track rails, said adjusting mechanism being operable to cause said supports to raise the lowered side platforms to a position flush with the central platform and rails, and complete said area so that a truck on the raised platforms may be maneuvered by its road wheels onto a highway.

2. A track and platform structure as specified by claim 1, the side platforms being provided with ramps on which the road wheels may run from and to the side platforms when the latter are raised, said ramps being arranged to guide a truck upward from the rails to the side platforms when the latter are raised, so that said supports and adjusting mechanism are relieved of the duty of raising the truck with the side platforms.

3. A track and platform structure as specified by claim 1, the said supports being embodied in swinging struts pivoted to fixed supports and to the side platforms, and adapted to swing in vertical planes and thereby simultaneously impart vertical and horizontal endwise movements to the side platforms, said platforms being provided with hinged ramps whose outer ends are slidable on fixed wear plates, said ramps being arranged to guide a truck upward from the rails to the side platforms when the latter are raised, so that said supports and adjusting mechanism are relieved of the duty of raising the truck with the side platforms.

4. A track and platform structure as specified by claim 1, the said supports being embodied in swinging struts pivoted to fixed supports and to the side platforms, and adapted to swing in vertical planes and thereby simultaneously impart vertical and horizontal endwise movements to the side platforms, the adjusting mechanism including a manually operable operating member and connections between said member and the adjustable supports whereby movements of the operating member are imparted to said supports.

5. A track and platform structure as specified by claim 1, the said supports being embodied in swinging struts pivoted to fixed supports and to the side platforms, and adapted to swing in vertical planes and thereby simultaneously impart vertical and horizontal endwise movements to the side platforms, the adjusting mechanism including a manually movable operating lever fulcrumed on a fixed support, bell crank levers fulcrumed on fixed supports, connections between the operating lever and the bell crank levers, and connections between the bell crank levers and the adjustable supports.

6. A track and platform structure as specified by claim 1, the said supports being embodied in swinging struts pivoted to fixed supports and to the side platforms, and adapted to swing in vertical planes and thereby simultaneously impart vertical and horizontal endwise movements to the side platforms, the adjusting mechanism including worm gear segments on the adjustable supports, a crank shaft journalled in fixed bearings, and worms fixed to the crank shaft and meshing with said segments.

7. A track and platform structure as specified by claim 1, comprising also guiding means on the side platforms to assist a driver in properly locating the road wheels thereon to locate the track wheels in position to be lowered onto the rail treads.

WILLIS A. HUTTON.